United States Patent [19]
Yamaguchi et al.

[11] 4,180,708
[45] Dec. 25, 1979

[54] FAULT-PROOF SYSTEM FOR MOBILE RADIO COMMUNICATION

[75] Inventors: Shoshichi Yamaguchi, Hakodate; Sadaatsu Okasaka, Yokohama; Yoshikazu Takayama, Tokyo, all of Japan

[73] Assignees: Nippon Telegraph & Telephone Public Corporation; Nippon Electric Co., Ltd., both of Tokyo, Japan

[21] Appl. No.: 829,110

[22] Filed: Aug. 30, 1977

[30] Foreign Application Priority Data

Aug. 30, 1976 [JP] Japan .................. 51-102611

[51] Int. Cl.² .................. H04B 7/26; H04Q 7/04
[52] U.S. Cl. .................. 179/2 EB
[58] Field of Search .................. 325/183, 37, 53; 343/227; 179/2 EB, 2 E

[56] References Cited
U.S. PATENT DOCUMENTS 2,991,353  7/1961  Barnes .................. 325/53
3,898,390  8/1975  Wells et al. .................. 179/2 EB

OTHER PUBLICATIONS

"WBEN, Buffalo, Upgrades with New Remote Controlled...", Anon., RCA Broadcast News, vol. 157, pp. 22-27, Dec. 1975.
"Data Transmission System Automatic Control Device", E. G. Allen et al., IBM Technical Disclosure Bulletin, vol. 9, No. 2, 7/1966, p. 144.

Primary Examiner—Thomas A. Robinson
Attorney, Agent, or Firm—Sughrue, Rothwell, Mion, Zinn and Macpeak

[57] ABSTRACT

A mobile communication system is disclosed having a plurality of base stations controllable from a single control station to transmit control signals from said control station to respective geographic zones. Fault detecting means capable of detecting transmission lapses, waveform irregularities, or phase irregularities, is provided in each base station for cutting off transmission when a fault is detected.

4 Claims, 6 Drawing Figures

FIG.1
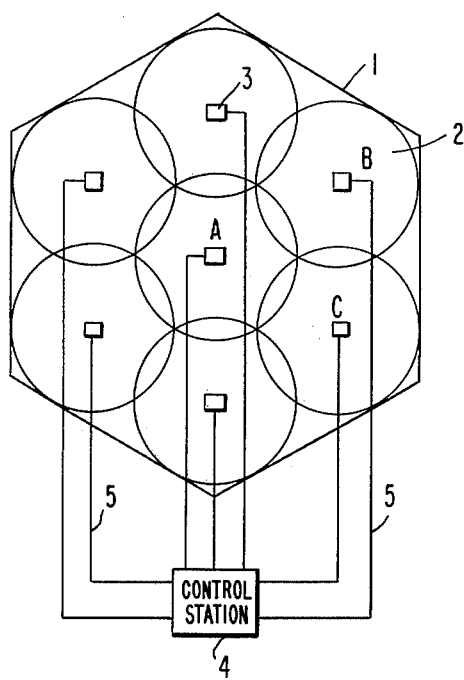
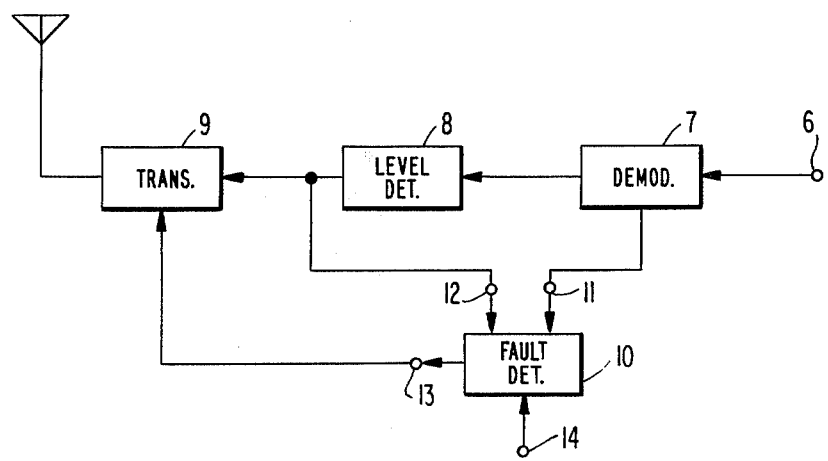
FIG.2

FAULT-PROOF SYSTEM FOR MOBILE RADIO COMMUNICATION

BACKGROUND OF THE INVENTION

The present invention relates to mobile radio communication systems such as a wide-zone automobile radio telephone system, and more particularly, to such type of communication systems in which influences of communication faults can be prevented or restricted.

In a typical conventional mobile radio communication system of the above-mentioned type such as the one disclosed in U.S. Pat. Nos. 3,898,390 or 4,028,500, a composite service area is established as an assembly of small zones formed by service areas of a plurality of base stations. Accordingly, if a mobile unit located in a first small zone moves into an adjacent second small zone while communication is in progress, a radio signal transmission path extending to the mobile unit must be switched from a base station having the first small zone as its service area to the adjacent base station of the second small zone. This switching control is effected by a control station for controlling all the base stations and/or the mobile units through radio transmission paths having radio frequencies which are different for the respective base stations and wire transmission lines connecting the control station to the respective base stations. For transmission of the control signals, radio frequencies (or channels) which are different from each other are assigned to the respective base stations. Accordingly, even if a communication fault should arise on the control signal wire transmission line between the control station and the base station, the influence of the fault would be limited only to a small zone formed by one base station and would not extend to another small zone. However, in order to transmit these control signals, assigned frequencies equal in number to the base stations are necessitated as described above.

One approach to the solution of this difficulty, would be to assign one common radio frequency to all the control signals for all the base stations, but in that case the influence of the above-mentioned fault cannot be limited to a small zone of one base station and there is a fear that the influence may extend to small zones of other base stations. More particularly, if feeding of a control signal from the control station to one base station is interrupted because of a fault on a wire transmission line, an electromagnetic wave transmitted from that base station becomes unmodulated. Accordingly, the unmodulated carrier wave interferes with modulated carrier waves of the same frequency transmitted from all the other base stations, resulting in difficulty in the reception of the modulated carrier waves, that is, the reception of the control signals in the respective small zones to which these base stations belong.

SUMMARY OF THE INVENTION

It is therefore, one object of the present invention to provide a fault-proof system for mobile radio communication, in which each base station is provided with a fault detector for detecting a communication fault on the wire transmission line connecting the control station to the base station, and when the fault has been detected, operation of the radio transmitter of that base station is interrupted, whereby the fault on the wire transmission line can be limited to only one small zone preventing its adverse effect upon the other small zones.

BRIEF DESCRIPTION OF THE DRAWINGS

FIG. 1 is an illustration of a zone construction in a mobile radio communication system;

FIG. 2 is a schematic block diagram showing a construction of a base station according to the present invention;

DETAILED DESCRIPTION OF THE PREFERRED EMBODIMENTS

Figure 3:
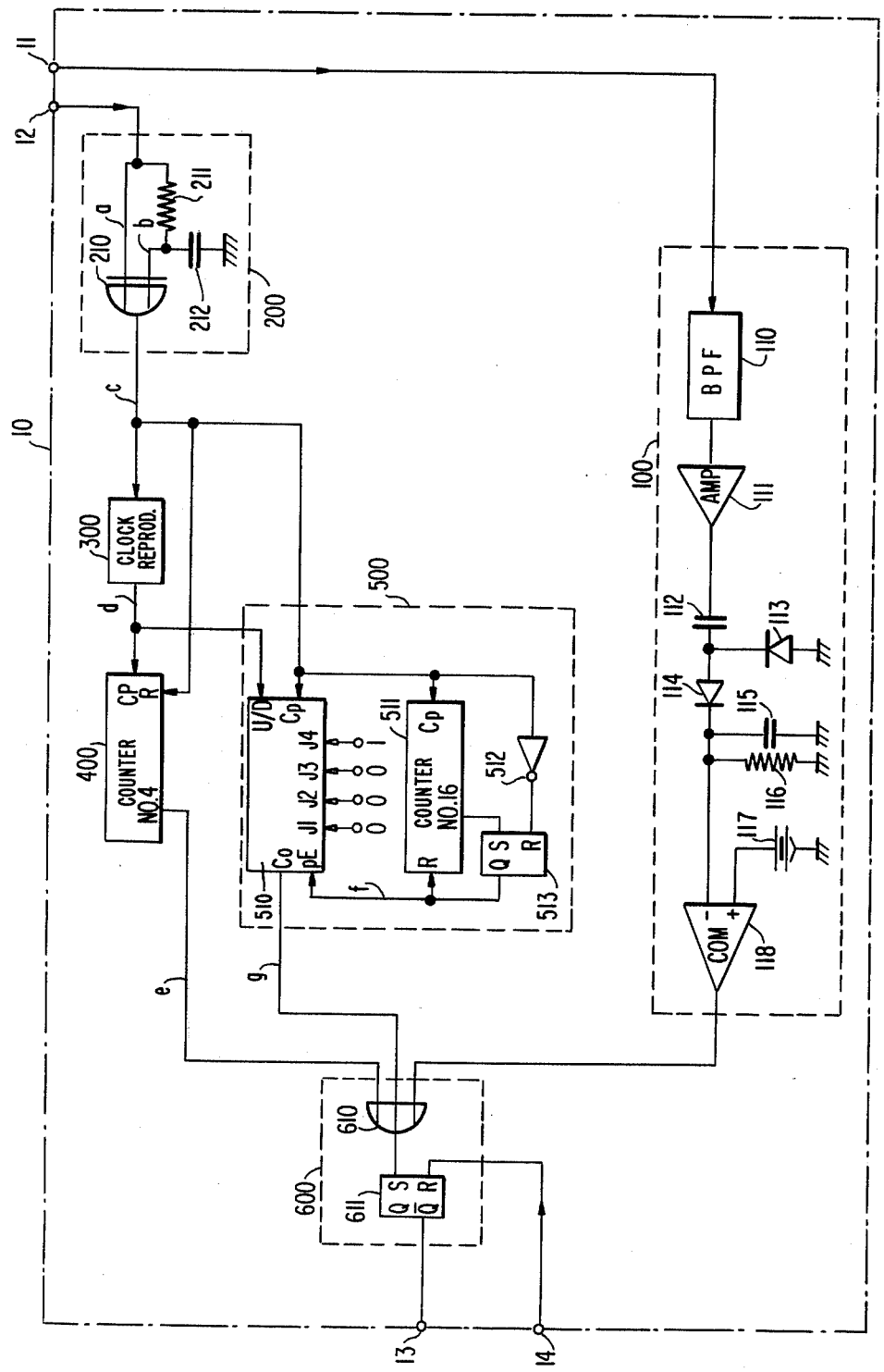
FIG. 3 shows one example of a detailed circuit construction of the fault detector in FIG. 2.

With reference to FIG. 1, reference numeral 1 designates a service area; 2, a small zone; 3, a base station; 4, a control station. The respective base stations 3 are connected to the control station 4 through wire transmission lines 5.

In the prior art system, the above-referred control signals (bi-level signals) for controlling mobile units are transmitted from the control station 4 through the wire transmission lines 5 to the respective base stations 3. In the respective base stations 3, radio frequencies which are different from each other are modulated respectively by these control signals, and are then transmitted to the mobile stations. In such a case, even if a communication fault should arise on one of the wire transmission lines 5, the influence of the fault is limited to a small zone formed by one base station and does not extend to a zone of another base station. However, in order to transmit these control signals, need arises for radio frequencies equal in number to the base stations. Therefore, in order to minimize the number of the radio frequencies (or channels) for transmitting control signals, a system can be thought of, in which only one radio frequency is assigned in common to the control signals for all the base stations. More particularly, the control signals are transmitted from the control station to all the base stations 3 concurrently. In the respective base stations, carrier waves, all having the same radio frequency, are modulated by these control signals, and are transmitted to mobile stations. In this case, in order to avoid problems caused by electromagnetic wave interference, which may arise if the carrier waves are transmitted at the same frequency from the respective base stations, the control signals are transmitted from the control station 4 in such manner that the waves may reach the respective base stations exactly in the same phase, by compensating for the differences in the transmission delay time caused by differences in the wire transmission line length to each base station 3.

Referring to FIG. 1 a description will now be made based on the assumption that a wire transmission line between the control station and one of the base stations is faulty.

For instance, when a wire transmission line 5 extending to one of the base stations, e.g., station A, becomes faulty, a control signal from the control station 4 cannot reach the base station A correctly. Accordingly, the electromagnetic wave transmitted from the base station A will be unmodulated. On the other hand, in other base stations, e.g., stations B and C, radio carrier waves are correctly modulated by the signals sent from the control station 4 and are transmitted continuously. Thus, the unmodulated wave from the base sation A and the modulated waves at the same frequency from the base stations B and C interfere with each other, and obviously, at a mobile unit the control signals from the control station 4 will not be received in a correct manner. The range over which such interference exists, can extend, in some case, over several tens of such small zones, and thus a fault on a wire transmission line to only one base station may possibly result in a fault over the entire service area.

Description will now be given of the system for preventing the expansion of a fault according to the present invention with reference to a block diagram of the base station shown in FIG. 2.

In this figure, reference numeral 6 designates a signal input terminal from a wire transmission line; 7, a demodulator; 8, a level detector; 9, a radio transmitter; 10, a fault detector; 11, 12 and 14, input terminals to the fault detector 10; and 13, an output terminal from the fault detector 10. A control signal (bi-level signal) from the control station 4 modulates a carrier wave which generally has a frequency within a voice frequency region. For instance, two frequencies 1,300 Hz and 2,100 Hz are respectively assigned to two levels "1" and "0". To the input terminal 6 is fed the control signal from the control station 4. In the demodulator 7 (consisting of an equalizer, a discriminator, a level detector circuit and the like), the two frequencies are converted into "1" and "0". In the level detector 8, the digital signal from the demodulator 7 is converted in levels so as to be adapted to a desired modulation degree at the radio transmitter 9. In the radio transmitter 9, a carrier wave is modulated by the converted levels and is transmitted to a mobile unit. The fault detection at the fault detector 10 is achieved by a method based on the fact that either one of the abovementioned frequencies is always fed to the input terminal 6 enabling the interruption of both these frequencies to be detected, or by a method in which a waveform having any regularity is employed as the waveform of the control signal from the control station, while monitoring the output signal from the level converted 8 with the fault detector 10, enabling non-fulfilment of the above regularity to be detected. Also, these methods can be employed in combination.

A more detailed example of the fault detector 10 is illustrated in FIG. 3. In this figure, reference numeral 100 designates a carrier wave detector circuit, which consists of a band-pass filter 110, an amplifier 111, capacitors 112 and 115, diodes 113 and 114, a resistor 116, a reference voltage source 117 and a voltage comparator circuit 118. Reference numeral 200 designates a level transition detector circuit, which comprises an Exclusive-OR gate 210, a resistor 211 and a capacitor 212. Reference numeral 300 designates a clock reproducer circuit. Reference numeral 400 designates a detector circuit (counter) for detecting waveform irregularity. Reference numeral 500 designates a detector circuit for detecting phase irregularity, which comprises an up-down counter 510, a counter 511, an inverter 512 and a flip-flop 513. Reference numeral 600 designates a memory circuit which comprises an OR gate 610 and a flip-flop 611. Reference numerals 11 to 14 designate the same terminals as represented in FIG. 2.

It is now assumed that as the control signal from the control station 4, a split-phase code (hereinafter refened to as SP code) having a transmission speed of, for example, 300 B/S is employed. According to the SP code, a signal "1" is coded by 0 in the first half of one bit period and 1 in the second half of the same, while signal "0" is coded by 1 in the first half of one bit period and 0 in the second half of the same. Consequently, the SP code signal always contains one level transition point during one bit period.

To the input terminal 11 of the fault detector 10 is fed a modulated signal from the control station 4 after it has had its level variation on the wire transmission line 5 compensated by an equalizer in the demodulator 7. This signal is fed to the carrier wave detector circuit 100, in which after the aforementioned two modulation frequencies have been filtered out by the band-pass filter 110, the passed signal is amplified by the amplifier 111. This amplified signal is converted into a D.C. level by means of the capacitors 112 and 115, diodes 113 and 114 and resistor 116. This D.C. level is compared with the reference voltage 117 by the voltage comparator 118, and if a signal exists at the input terminal 11, a logic "0" is emitted at the output of the detector circuit 100 and is fed to the fault memory circuit 600, where as if a signal is not present at the input terminal 11, a logic "1" is emitted at the output. The logic "1" at the output implies that a fault exists on the wire transmission path 5 between the control station 4 and the base station 3.

To the input terminal 12 of the fault detector 10 is fed a bi-level control signal demodulated by the demodulator 7 and the level converter 8. By making use of the regularity of this control signal, waveform irregularity and phase irregularity are respectively detected by the detectors 400 and 500.

Figure 4:
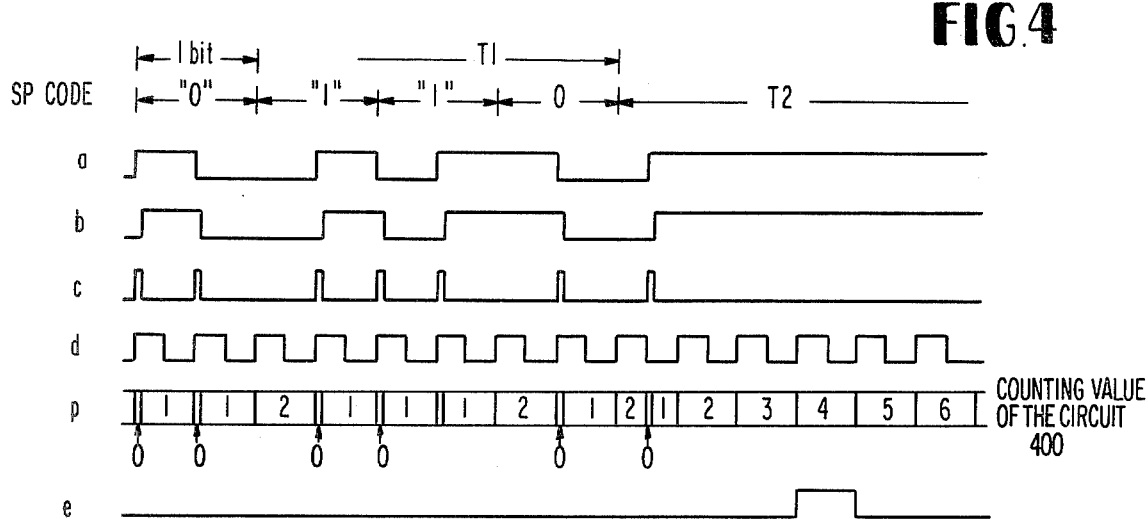
FIG. 4 shows waveforms at various points in FIG. 3.

At first, the method for detecting the waveform irregularity will be explained with reference to FIG. 4. The control signal (in an SP code) is fed to the level transition point detector circuit 200. This waveform is assumed to be as shown at a in FIG. 4. The waveform a is delayed by the resistor 211 and capacitor 212, and converted into a waveform b. These waveforms a and b are applied to the Exclusive-OR gate 210 resulting in waveform c at its output. As will be apparent from waveform c, a pulse appears at each level transition of the control signal. This output of the detector circuit 200 is applied to the clock regenerator 300, where clock pulses having a waveform d can be reproduced. It is to be noted that as the clock regenerator 300, a clock regenerator disclosed in the copending U.S. patent application Ser. No. 731,152 (Applicants, Yoshiko Sato et al; and Assignee, Nippon Electric Company, Ltd.), now issued as U.S. Pat. No. 4,087,627 could be employed.

To a clock terminal (CP) of the counter 400 is fed the output (waveform d) of the clock reproducer circuit 300, and to a reset terminal (R) thereof is fed the output (waveform c) of the detector circuit 200. Since the waveform c resets the counter 400 at an interval of either 1 bit or ½ bit, if the waveform is not disturbed on the wire transmission line 5 as shown at the interval $T_1$ in FIG. 4, then the count (p in FIG. 4) in the counter 400 never reaches the value "4". However, if the waveform is disturbed as shown at the interval $T_2$ in FIG. 4, the count in the counter 400 reaches the value "4", so that a logic "1" is derived from the counter 400 as shown at e in FIG. 4, and thereby enabling the irregularity of the waveform to be detected.

Figure 5:
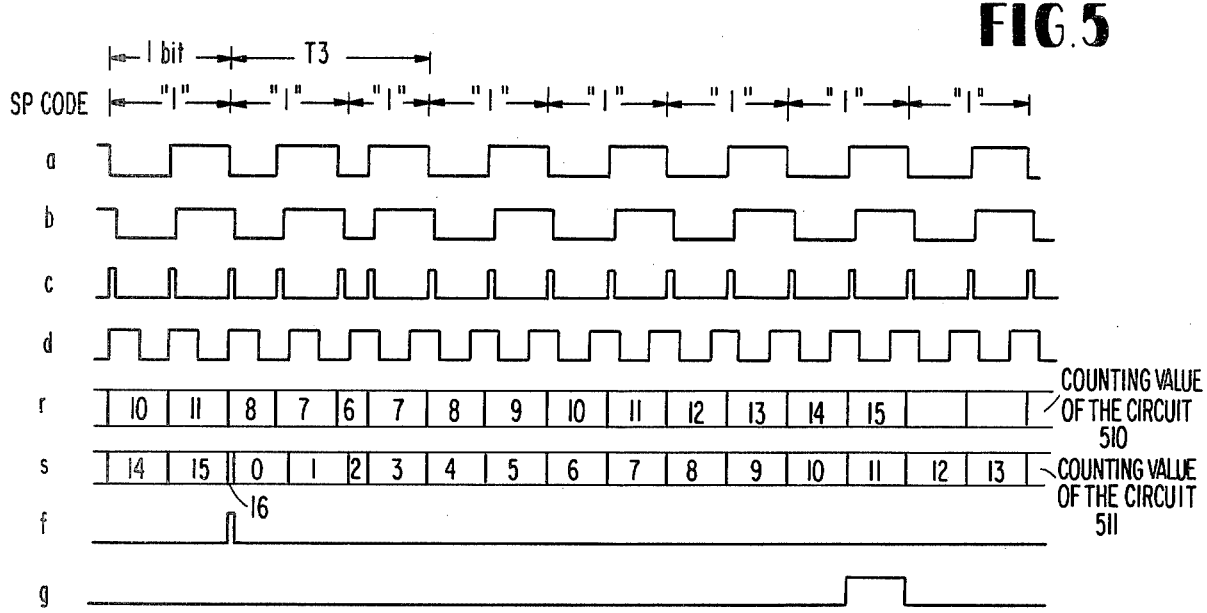
FIG. 5 shows waveforms at various points in FIG. 3.

Now the method for detecting the phase irregularity will be explained with reference to FIG. 5. The detector circuit 500 is composed of a circuit for counting the level transition points at the output of the detector circuit 200 up to 16 by means of the counter 511, flip-flop 513 and inverter 512, and the up-down counter 510. Each time the counter 511 has counted the level transition point pulses (waveform c in FIG. 5) up to 16 (waveform s in FIG. 5), a pulse (waveform f in FIG. 5) is fed to a PE (preset enable) terminal of the counter 510, and the count in the counter 510 (r in FIG. 5) is set at its initial value 8. The counter 510 is controlled by the reproduced clock signal (waveform d in FIG. 5) so as to count up or count down. More particularly, the counter 510 counts up when the clock pulse (waveform d in FIG. 5) delays with respect to the level transition point pulse (waveform c in FIG. 5), while it counts down when the clock pulse advances with respect to the level transition point pulse. If the control signal is normal, the counter 510 is set at a value near to the count value 8. However, if a phase change should occur as illustrated by the interval $T_3$ in FIG. 5, count-up (or count-down) would arise continuously until the count value reaches 15 (or 0), when the detector 500 emits at its output a logic "1" as shown by waveform g in FIG. 5. Such phase irregularity can be detected.

If a logic "1" is emitted at any one of the outputs of the detectors 100, 400 and 500, then the flip-flop 611 of the memory circuit 600 is set, resulting in an output "0" at its output terminal 13, which interrupts the operation of the radio transmitter 9. After the fault has been recovered, a pulse in applied to the reset terminal 14 to reset the flip-flop 611 and then the operation of the base station is restarted.

Owing to the above-described operations, when a fault has been detected at one of the base stations, the electromagnetic wave transmitted from the base station is interrupted. Thus, there will not occur interference with the electromagnetic waves transmitted from the other base stations. The control signal from the control station 4 cannot be received by the mobile unit only in the area covered by that base station, but can be received correctly in the other areas.

Figure 6:
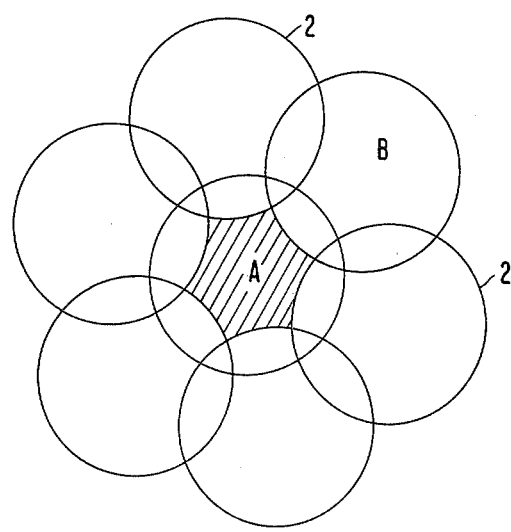
FIG. 6 is an illustration of a service area pattern for describing the function of the present invention.

Furthermore, the areas covered by the respective base stations are normally established so as to be partly overlapped with each other as shown in FIG. 6. Accordingly, even if the operation of the transmitter of the base station A should be interrupted, the faulty area in each case is only the hatched portion of the service area of the base station A as shown in FIG. 6, and so, the faulty area is a relatively small area in comparison to the entire service areas.

As described above, according to the present invention the occurrence of a fault on the wire transmission line from the control station to a base station will not expand to a fault extending over the entire service area. The faulty area can be limited to a minimum, and so, it is possible to provide mobile radio services of high reliability.

What is claimed is:

1. In a mobile radio communication system of the type having a composite service area established as an assembly of small zones formed by service areas of a plurality of base stations, respectively, each base station having a radio transmitter installed for its respective small zone, and a control station for sending control signals from said control station through a wire transmission line to allow said respective base stations to modulate carrier waves of one common frequency by said control signals which are mutually in-phase to transmit the modulated carrier waves to mobile units; the improvement comprises in a base station, first means for detecting a phase irregularity of said control signal to produce a first pulse and second means responsive to said first pulse for interrupting the operation of the radio transmitter of said base station.

2. The invention of claim 1, wherein the improvement further comprises in a base station, third means coupled to the first means for detecting a waveform irregularity of said control signal to produce said first pulse.

3. The invention of claim 2, wherein said first means comprises fourth means for detecting level transition points of said control signal to produce a train of pulses, fifth means responsive to said train of pulses for reproducing a clock pulse signal, and sixth means for detecting the phase difference between said train of pulses and said clock pulse signal to produce said first pulse when the phase difference is beyond a predetermined limit, and said third means comprises seventh means controlled by said train of pulses for counting said clock pulses and producing said first pulse at a first predetermined count value.

4. The invention of claim 3, wherein said sixth means comprises eighth means controlled by said clock pulse signal and a preset enable pulse for counting up or down said train of pulses to produce said first pulse at a second predetermined count value, ninth means for counting said train of pulses to produce a third pulse at a third predetermined count value, means for inverting said train of pulses, and tenth means controlled by said third pulse and the inverted train of pulses for producing said preset enable pulse and controlling said ninth means.

* * * * *